(12) United States Patent  
Wyatt

(10) Patent No.: US 7,882,381 B2  
(45) Date of Patent: Feb. 1, 2011

(54) MANAGING WASTED ACTIVE POWER IN PROCESSORS BASED ON LOOP ITERATIONS AND NUMBER OF INSTRUCTIONS EXECUTED SINCE LAST LOOP

(75) Inventor: David Anthony Wyatt, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 973 days.

(21) Appl. No.: 11/478,225

(22) Filed: Jun. 29, 2006

(65) Prior Publication Data

US 2008/0005593 A1    Jan. 3, 2008

(51) Int. Cl.
G06F 1/32    (2006.01)

(52) U.S. Cl. .................. 713/323; 712/241; 713/320

(58) Field of Classification Search .......... 713/320, 713/323; 712/241
See application file for complete search history.

(56) References Cited

U.S. PATENT DOCUMENTS

| | | | |
|---|---|---|---|
| 5,388,265 A | 2/1995 | Volk | |
| 5,465,367 A | 11/1995 | Reddy et al. | |
| 5,493,684 A * | 2/1996 | Gephardt et al. | 713/322 |
| 5,541,489 A | 7/1996 | Dunstan | |
| 5,565,759 A | 10/1996 | Dunstan | |
| 5,600,230 A | 2/1997 | Dunstan | |
| 5,752,050 A | 5/1998 | Hernandez et al. | |
| 5,815,693 A * | 9/1998 | McDermott et al. | 713/501 |
| 5,887,178 A * | 3/1999 | Tsujimoto et al. | 713/322 |
| 5,953,536 A | 9/1999 | Nowlin, Jr. | |
| 5,982,146 A | 11/1999 | Nguyen | |
| 6,108,545 A | 8/2000 | Keshavachar | |
| 6,493,741 B1 | 12/2002 | Emer et al. | |
| 6,509,657 B1 | 1/2003 | Wong et al. | |
| 6,545,448 B1 | 4/2003 | Stanley et al. | |
| 6,606,490 B1 | 8/2003 | Rainish et al. | |
| 6,611,918 B1 | 8/2003 | Uzelac | |
| 6,640,268 B1 | 10/2003 | Kumar | |
| 6,664,792 B1 | 12/2003 | Nguyen | |
| 6,668,179 B2 | 12/2003 | Jiang | |
| 6,671,795 B1 | 12/2003 | Marr et al. | |
| 6,711,447 B1 | 3/2004 | Saeed | |
| 6,957,354 B2 | 10/2005 | Uzelac et al. | |

(Continued)

OTHER PUBLICATIONS

IBM Technical Disclosure Bulletin, Dec. 1989, vol. 32(7), pp. 78-82.*

(Continued)

*Primary Examiner*—Albert Wang
(74) *Attorney, Agent, or Firm*—Blakely, Sokoloff, Taylor & Zafman LLP

(57) ABSTRACT

Methods of managing wasted active power of processors in computer systems and other electronic devices are disclosed. In one aspect, a method may include counting a number of times that a processor has performed an instruction loop. Then, a determination may be made whether the number of times that the processor has performed the loop is greater than one or more thresholds or other given values. Next, a limit may be imposed on the power of the processor if the number of times that the processor has performed the loop is greater than at least one of the thresholds or given values. Logic to perform such methods is also disclosed, as are systems suitable for incorporating such logic.

26 Claims, 8 Drawing Sheets

U.S. PATENT DOCUMENTS

| | | |
|---|---|---|
| 7,051,222 B2 | 5/2006 | Wyatt et al. |
| 7,127,561 B2 | 10/2006 | Hill et al. |
| 7,149,909 B2 | 12/2006 | Cui et al. |
| 7,213,093 B2 | 5/2007 | Hammarlund et al. |
| 7,321,369 B2 | 1/2008 | Wyatt et al. |
| 2003/0210247 A1 | 11/2003 | Cui et al. |
| 2004/0128569 A1 | 7/2004 | Wyatt et al. |
| 2005/0268001 A1* | 12/2005 | Kimelman et al. ............ 710/15 |
| 2006/0123253 A1* | 6/2006 | Morgan et al. .............. 713/300 |
| 2006/0291532 A1 | 12/2006 | Wyatt |
| 2007/0140030 A1 | 6/2007 | Wyatt |
| 2007/0191993 A1 | 8/2007 | Wyatt |

OTHER PUBLICATIONS

"Using Spin-Loops on Intel Pentium 4 Processor and Intel Xeon Processor", Version 2.1, May 24, 2001, pp. 1-11.

* cited by examiner

MANAGING WASTED ACTIVE POWER IN PROCESSORS BASED ON LOOP ITERATIONS AND NUMBER OF INSTRUCTIONS EXECUTED SINCE LAST LOOP

BACKGROUND

1. Field

Embodiments of the invention relate to computer systems. In particular, embodiments of the invention relate to power management in computer systems.

2. Background Information

Many modern computer systems include both a main processor and one or more co-processors. Examples of suitable co-processors include, but are not limited to, math, graphics, audio, storage, and other bus-mastering input/output processors known in the arts.

The main processor and co-processor may perform processing in parallel. For example, the main processor may provide pointers, instructions, and data to the co-processor, such as, for example, by storing them in a first-in-first-out (FIFO) buffer, linear/circular queue, or other storage device. The co-processor may process the instructions and data in parallel with the processing performed by the main processor. The co-processor may then provide status information to the main processor. For example, the co-processor may have one or more status registers or memories through which it may provide completions, interrupts, failures, or other execution status information. There are various known ways in which the main processor and co-process may exchange status information.

Including one or more of such co-processors generally tends to improve system performance. For example, the co-processor may help to provide increased parallelism and/or help to offload tasks from the main processor. In some cases, the co-processor may be better suited at performing the off-loaded tasks than the main processor.

However, in certain situations, the execution of the main processor may need to wait on the execution of the co-processor. For example, the main processor may need to wait for a dependent operation to complete within the co-processor in order to proceed. This may tend to be exacerbated when the main processor operates significantly faster than the co-processor. As another example, the work-around for some bugs may involve flushing the queue of the co-processor before taking further actions. In such example scenarios, the main processor may stall waiting for the co-processor to complete its tasks.

In certain advanced architectures, the stalled thread may halt, and wait for an interrupt from the co-processor to wake it up. In certain highly-threaded processor architectures, execution may potentially continue with other threads while waiting for the interrupt. However such event based synchronization is not always available. For example, legacy code may not support multi-threading or programmers may not take the extra effort to implement such multi-threading. As another example, certain processes, such as, for example, critical processes and/or processes that do not support re-entrancy, may need to continue until complete and may not allow for the possibility of introducing an interrupt. Still other environments simply do not allow for interruption and/or weren't designed for such threadedness. Accordingly, in some cases, the main processor may repeatedly execute a polling loop where the main processor may repeatedly execute a loop of instructions or otherwise await status of the co-processor for an indication that the work has been completed.

Such polling loops may occupy or busy the main processor. Some processors, such as, for example, those employed in laptops and other battery powered computing devices, may have multiple different operational power states, including faster, higher-powered states for rapid execution, and slower, lower-powered states to conserve power and/or reduce heat generation. The polling loops may be performed while the main processor is operating in a relatively high power state. In some instances the loops may potentially contribute to promotion of the main processor from a lower to a higher power state.

However, having the main processor in a higher power state during such polling loops may not significantly speed up execution, since the execution of the main processor may be waiting on the execution of the co-processor to continue. Faster polling of the co-processor for status may not cause the co-processor to complete processing any faster. Rather, the higher power state of the processor and/or the faster polling may unnecessarily waste power and produce heat.

Furthermore, laptops and other computer systems tend to have limited cooling capabilities that are shared by the main processor, co-processor, and other components. Excess heat produced by one component, such as, for example, a main processor, may reduce the amount of cooling available to other components, such as, for example, the co-processor, which may cause the other component to reach its thermal limit faster. This may potentially cause or result in a reduction in performance of the component or co-processor. Accordingly, in some situations, the excess heat produced by the main-processor during a tight polling loop waiting on the co-processor may result in heating and a corresponding reduction in performance of the co-processor on which the main processor is waiting. This may tend to increase the duration of the loop and compound the problem.

Power savings and/or heat reduction may potentially be achieved if the processor is placed in relatively lower power states during such loops.

BRIEF DESCRIPTION OF THE SEVERAL VIEWS OF THE DRAWINGS

The invention may best be understood by referring to the following description and accompanying drawings that are used to illustrate embodiments of the invention. In the drawings.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description.

Figure 1:
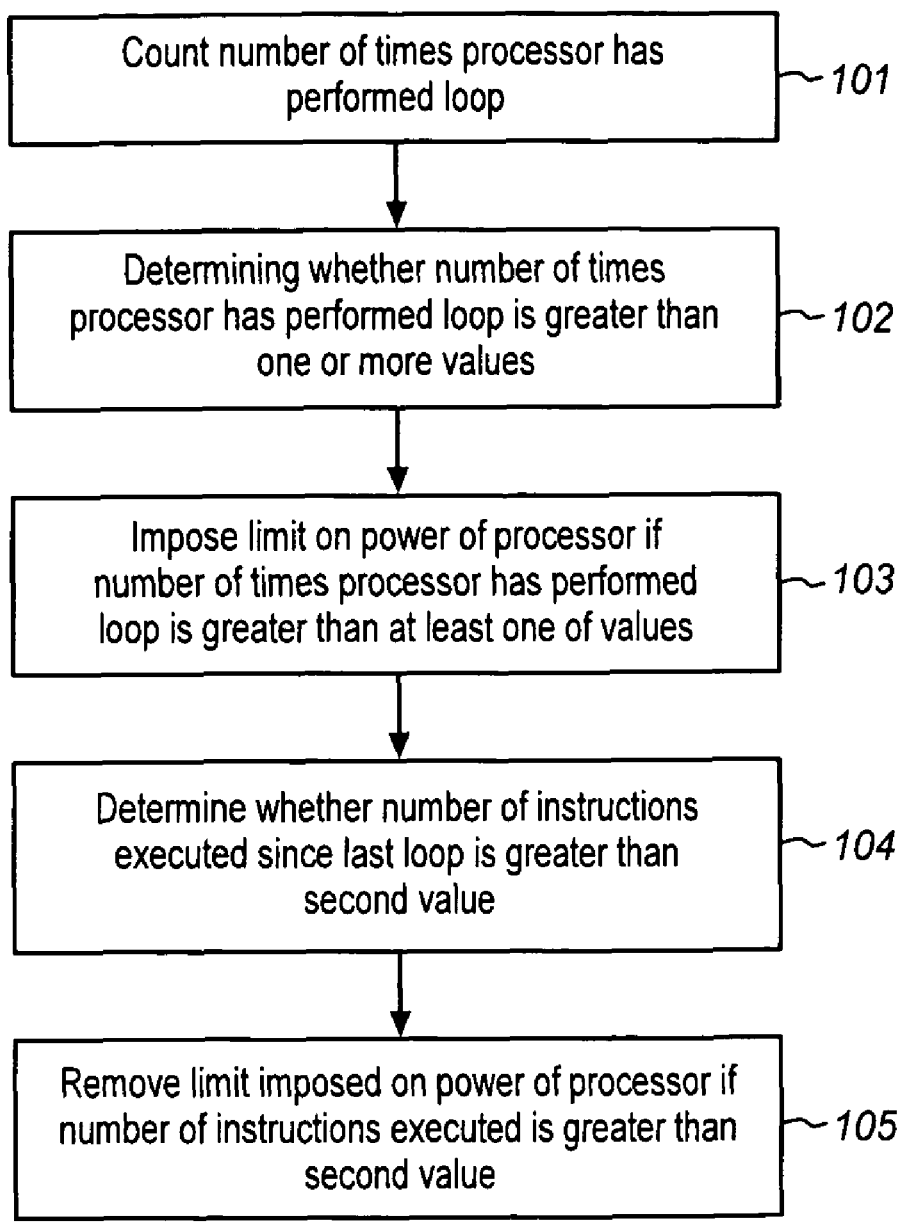
FIG. 1 is a block flow diagram of a method of managing power of a processor, according to one or more embodiments of the invention.

FIG. 1 is a block flow diagram of a method of managing power of a processor, according to one or more embodiments of the invention. In one aspect, the method may be performed in real time by hardware, software, or a combination, during execution of instructions by a main processor in order to reduce power consumption and limit heat generation during polling loops where the main processor executes a loop of instructions and awaits results of a co-processor or other component of the computer system.

Initially, a number of times a processor has performed a loop may be counted, at block 101. In one or more embodiments of the invention, a signature may be generated for the loop and used to count the number of times the loop has been performed. In various embodiments of the invention, the signature may include a hash generated by a hash function, a checksum, or a count of the number of instructions in the loop, although the scope of the invention is not limited in this respect.

Then, a determination may be made whether the number of times the processor has performed the loop is greater than one or more thresholds or other given values, at block 102. In one or more embodiments of the invention, the values may include predetermined values, although this is not required. In one or more embodiments of the invention, multi-staged power limits may be implemented by comparison to multiple progressively increasing thresholds that are increasingly indicative that the main processor is in a polling loop awaiting results of the co-processor.

Next, a limit may be imposed on the power of the processor if the number of times the processor has performed the loop is greater than at least one of the given values, at block 103. Imposing a limit on the power of the processor may include imposing a limit on the frequency and voltage of the processor or one or more cores, functional units, circuits, or other portions thereof, and/or turning off or disabling one or more cores, functional units, circuits, or other portions of the processor.

This may help to consume power, such as, for example, battery power. This may also help to allow a co-processor or other component to utilize more of the shared cooling capabilities of the system by reducing the heat generated by the processor while the processor is engaged in the loop and waiting on results from one or more other components.

After placing at least one limit on the power of the processor, a determination may be made whether a number of instructions executed in a run, such as, for example, since the last loop, or since the last loop indication instruction, is greater than a second given threshold or value. In one aspect, this threshold or value may be predetermined, although this is not required. In one or more embodiments of the invention, the second given value or threshold may be larger than an average or typical polling loop size, such as, for example, based on prior execution, simulation, history, or other modes of estimation. As one example, the second given value or threshold may equal or exceed a running toll or record of the largest number of instructions executed in a loop performed thus far in execution by the processor. As another example, the second given value or threshold may be a number that is larger than expected for polling loops based on simulation, history, or other modes of estimation.

Next, the limit imposed on the power of the processor may be removed, or at least reduced, if the number of instructions executed is greater than the second given value, at block 105. In this way, since the processor has likely executed the polling loop, the limits may be removed so that the processor may resume performing useful work at high speed.

Figure 2:
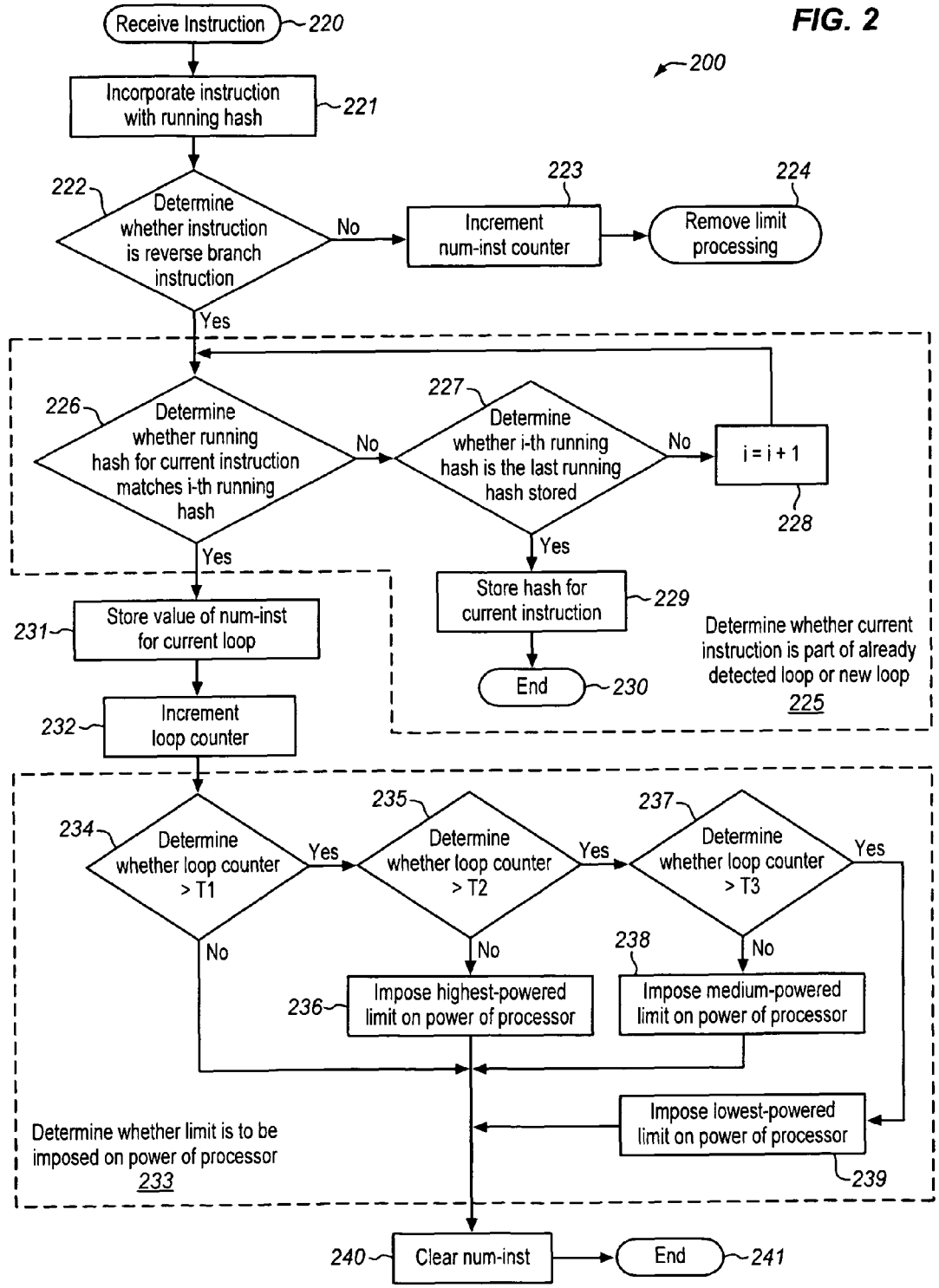
FIG. 2 is a block flow diagrams of a method of managing power of a processor using a running hash as a signature, according to one or more embodiments of the invention.
Figure 3:
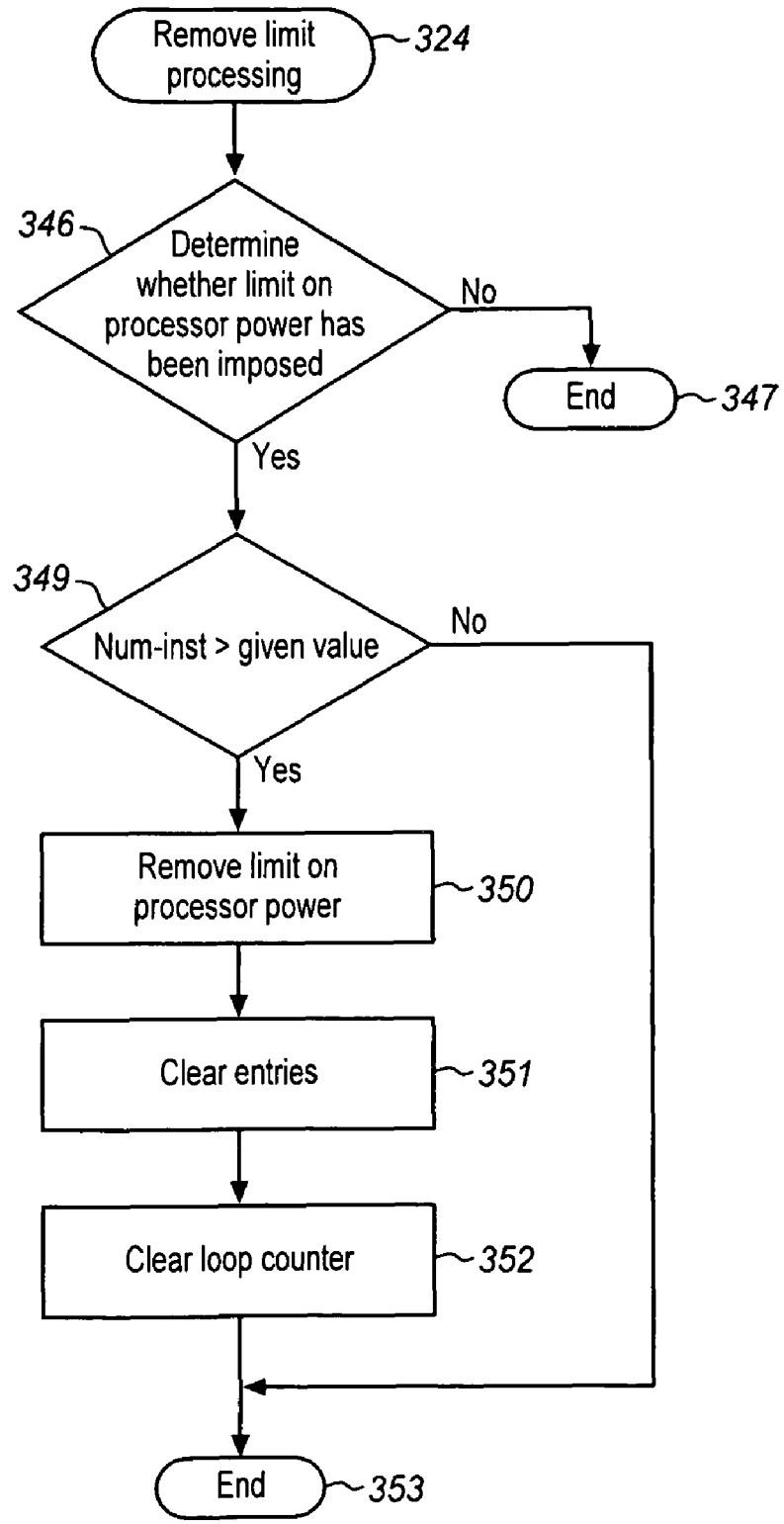
FIG. 3 is a block flow diagram illustrating remove limit processing using instructions counted using the method of FIG. 2, according to one or more embodiments of the invention.

FIGS. 2-3 are block flow diagrams of a method of managing power of a processor using a hash, or other electronic signature computed with a function, according to one or more embodiments of the invention. The method may be performed for each instruction of code executed or otherwise processed.

The method may commence at block 220. At block 220, a new instruction of code may be fetched, retrieved, loaded, or otherwise received for processing in an instruction pipeline of a main processor. In various embodiments of the invention, the instruction may be received from a static memory, such as, for example, a random access memory (ROM) or flash memory, or from a main system memory, or from a disc, by the processor.

The instruction may have an opcode that specifies an operation to be performed, potentially immediate data, and one or more data addresses. The immediate data may represent fixed data that is natively included with an instruction as opposed to indirect data in a register or other storage location identified by the instruction, which may potentially change during a loop. The immediate data is fixed by the instruction code and therefore may be the same each time a loop is executed. By way of example, the data addresses may include source data addresses, destination data addresses, and combinations thereof. The addresses may include addresses in a register, system memory, other storage locations, and combinations thereof. The addresses may help to avoid confusing a stalled polling loop for a pattern search routine or other thread that uses indirect addressing, which may be performing useful work, but is not required.

The method may advance from block 220 to block 221. At block 221, the instruction may be added to or incorporated to a running hash computed, calculated, or otherwise generated for preceding instructions in the loop. In one or more embodiments of the invention, information from the current instruction may be provided as input to a hash function, which may generate the running hash based in part on the input for the current instruction and based in part on information from previously encountered instructions in the loop. The hash function has the following properties: (a) if hashes (outputs) generated using the same hash function are different, then the corresponding inputs to the hash function are different; and (b) the equality of hashes (outputs of the function) suggests or strongly suggests (but does not necessarily guarantee) the equality of the corresponding inputs to the hash function. For example, in one or more embodiments of the invention, "suggests" may mean that there is at least a 90% likelihood of the equality of the inputs, and "strongly suggests" may mean that there is at least 99% likelihood of the equality of the inputs, although other embodiments are not limited in this respect. Other functions having these properties are also suitable. The running hash may represent a relatively unique electronic signature or fingerprint to represent or identify the current and preceding instructions. The relatively unique signature or fingerprint may be used to identify a loop from other loops, since it is recognized that various different types of loops, such as, for example, simple loops, loops with inner loops, loops with forward skips, and loops with inner sub-routines, and combinations of such loops, may potentially be encountered.

In one or more embodiments of the invention, the information from the instruction that may be provided as input to generate the running hash may include the opcode, the immediate data, and the data addresses of the instruction. Notice that, in one or more embodiments of the invention, the indirect data stored in the data addresses specified by the instruction may not be provided as input to generate the running hash, since this may potentially vary within a loop. Variance may cause the running has generated for repeat executions of the same loop to vary, which may tend to hinder detection of repeat executions of the same loop. Rather, the hard coded instruction data may be used to generate the running hash.

Various hash functions are suitable. Examples of suitable hash functions include, but are not limited to, DJB, DEK, ELF, and CRC32, although the scope of the invention is not limited to just these particular examples. In one aspect, the hash function may favor lightweight inner core algorithm, may be capable of handling large amounts of byte code with few collisions, and may be suitable for hardware implementation, although this is not required. Alternatively, a hash function is not required and other functions, such as, for example, checksums, error correaction codes, cyclic redundancy checks, Reed-Solomon codes, and the like, may optionally be used. The method may advance from block 221 to block 222. At block 222, a determination may be made whether the instruction is a reverse branch instruction.

There are various ways to determine whether or not an instruction is a reverse branch instruction. As one example, in the IA32 and IA64 instruction set architectures, a jump instruction with an address less than the current instruction address may be inferred to be a reverse branch instruction. As another example, a loop instruction specifying a non-zero reverse instruction offset (or an instruction address less than the current instruction pointer) may represent a reverse branch instruction. Other instructions that reverse execution flow or that are know to be associated with loops in these or other instruction set architectures may also be determined to be reverse branch instructions.

If the instruction is not a reverse branch instruction (i.e., "no" is the determination at block 222), then the method may advance to block 223. At block 223, a running counter representing the number of instructions processed since the last reverse branch instruction was encountered (num-inst) may be incremented, or increased by one, to account for the current instruction.

The method may advance from block 223 to block 224. Block 224 may represent remove limit processing that may be used to determine whether a limit has been imposed on the maximum power of the processor and if that limit should be removed, or at least reduced. In one or more embodiments of the invention, this determination may be made based, at least in part, on the value of the running counter representing the number of instructions processed since the last reverse branch instruction was encountered (num-inst). For example, in various embodiments of the invention, if num-inst is greater than a threshold, such as, for example, a typical loop size or the loop size empirically observed to provide useful processing work, or the largest loop size encountered thus far, then the limit may be removed, or at least reduced. FIG. 3, which will be discussed below, illustrates example remove limit processing, according to one or more embodiments of the invention, although this particular processing is not required.

Alternatively, if the instruction is a reverse branch instruction (i.e., "yes" is the determination at block 222), then the method may advance to block 226. Block 226 is one of a set 225 of blocks 226, 227, 228, 229, and 230, which illustrate an embodiment of determining whether the reverse branch instruction is part of an already detected and/or stored loop or part of a new loop to be stored.

During previous performances of the method, multiple different loops may be encountered. A unique running hash may be created for each of the different loops up to the point of the associated reverse branch instruction for each of these loops. These unique running hashes may be stored, such as, for example, in a table, list, stack, data structure, record, or other storage. See, for example, the discussion of block 229 a few paragraphs below. Each of these unique running hashes may uniquely identify its corresponding loop. If a comparison indicates that two running hashes equal or match, then by inference this may represent repeat executions of the same loop.

At block 226, a determination may be made whether the running hash generated up to this point for the current reverse branch instruction (the current loop), is equal to or otherwise matches a running hash stored in the table, list, stack, data structure, record, or other storage, which is indexed by a current value of a counter (i). In the illustrated embodiment, the counter (i) may initially have or be assigned a lowest value, such as, for example, zero or one, and thereafter may be incremented, although the scope of the invention is not so limited.

If the running hashes do not match (i.e., "no" is the determination at block 226), then the method may advance to block 227. At block 227, a determination may be made whether the counter (i) indexes the last entry in the table, list, stack, data structure, record, or other storage.

If the counter (i) does not index the last entry in the storage (i.e., "no" is the determination at block 227), then the method may advance to block 228. This may mean that there are additional running hashes in the data structure that have not yet been compared to the running hash for the current branch instruction at block 226. Accordingly, at block 228, the value of the counter (i) may be incremented or increased by one. This may index or otherwise select the next running hash in the data structure. The method may then revisit block 226.

Alternatively, if the counter does index the last entry in the table or other storage (i.e., "yes" is the determination at block 227), then the method may advance from block 227 to block 229. At block 229, the running hash for the current branch instruction may be stored in an available location in the table, list, stack, data structure, record, or other storage. That is, since at this point the running hash for the current reverse branch instruction has been compared to all of the running hashes for previously encountered loops detected and stored, and since not match has been found, it may be inferred that the current reverse branch instruction has not previously been encountered and/or that the loop associated with the current reverse branch instruction is a new loop to be added to the list or table or otherwise stored.

The method may then advance from block 229 to block 230, where the method may terminate. Since the present loop is a new loop, there is no indication yet that the loop has or will stall, and accordingly, no limiting of the power state may be justified at this point. Note that the method terminates for the current instruction, and that another instance of the method may be performed, starting at block 220, for the next instruction received for processing.

Accordingly, the method may loop through blocks 226, 227, and 228 zero or more times until either all of the entries in the storage have been compared to the running hash for the current branch instruction and either a match has been found at block 226, in which case processing may advance from block 226 to block 231, or else the last entry in the storage has been reached without a match, in which case processing may advance from block 227 to block 229.

Referring again to block 226, if the running hashes compared are equal or otherwise match (i.e., "yes" is the determination at block 226), then the method may advance to block 231. An equality or match between the unique running hash generated for the current reverse branch instruction and a unique running hash stored for a previously encountered loop may indicate or allow it to be inferred that the loop corresponding to the current reverse branch instruction is the same as a previously encountered loop corresponding to the running hash stored in the table or other storage.

At block 231, the value of the running counter (num-inst) previously discussed above in connection with block 223, may be stored in the table, list, stack, data structure, record, or other storage at the same entry or index as the matching running hash. Accordingly, for each index, a running hash value and a value of num-inst may be stored. Recall that the counter num-inst may represent the number of instructions processed since the last reverse branch instruction was encountered. The size of num-inst represents the size or number of instructions in the loop. The values of this counter (num-inst) may be used in connection with block 349 of FIG. 3, which will be discussed further below.

The method may advance from block 231 to block 232. At block 232 a loop counter indexed by the current value of the counter (i) may be incremented or increased by one. The loop counter may represent the number of times the loop corresponding to the current reverse branch instruction has been performed. Accordingly, this may count the number of times the loop associated with the current instruction has been performed. The value of the loop counter may optionally be stored at the same index as the matching running hash, although this is not required. Alternatively, one or more single non-arrayed loop counter(s) with potentially different names may optionally be employed.

The method may then advance from block 232 into one or more of a set 233 of blocks 234-239, which may illustrate an embodiment of determining whether a limit is to be imposed on the power of a processor. The determination may involve a series or progression of one or more comparisons to given thresholds or values and progressive conditioned application of power state limits based at least in part on the comparisons to the thresholds or values.

In particular, the method may advance from block 232 to block 234. At block 234, a determination may be made whether the value of the loop counter indexed by or corresponding to the current reverse branch instruction is greater than a first lowest-valued threshold (T1). T1 may have a value suitable for the particular implementation. Representative values that are suitable for certain embodiments of the invention will be discussed further below.

If the loop counter is not greater than T1 (i.e., "no" is the determination at block 234), then limiting the maximum power of the processor may not yet be justified. In such a case, the method may advance to block 240, which will be discussed further below.

Alternatively, if the loop counter is greater than T1 (i.e., "yes" is the determination at block 234), then the method may advance from block 234 to block 235. At block 235 another determination may be made whether the loop counter is greater than a second middle-valued threshold (T2). T2 may be greater than T1.

If the loop counter is not greater than T2 (i.e., "no" is the determination at block 235), then the method may advance to block 236. At block 236 a first highest-powered limit or ceiling may be imposed on the maximum power of the processor, and the power of the processor may be reduced to below the first limit. In various embodiments of the invention, the power state may be limited through hardware, such as, for example, fuses, controls, or other circuits, or through software. In various embodiments of the invention, limiting the power may include reducing frequency, voltage, turning off certain circuits, such as, for example, functional units or cores of a multi-core processor, and combinations thereof. Various ways of reducing power known in the arts are suitable. The method may then advance to block 240, which will be discussed further below.

Alternatively, if the loop counter is greater than T2 (i.e., "yes" is the determination at block 235), then the method may advance to block 237. At block 237, yet another determination may be made whether the loop counter is greater than a third highest-valued threshold (T3). T3 may be greater than T2.

If the loop counter is not greater than T3 (i.e., "no" is the determination at block 237), then the method may advance to block 238. At block 238 a second, medium-powered limit or ceiling, may be placed on the maximum power of the processor, and the power of the processor may be reduced to below the second, lower limit. The second limit may represent a lesser total operational power than the first limit. The method may then advance to block 240, which will be discussed further below.

Alternatively, if the loop counter is greater than T3 (i.e., "yes" is the determination at block 237), then the method may advance to block 239. At block 239, a third, lowest-powered limit or ceiling, which may be lower than the first and second limits, may be placed on the maximum power of the processor, and the power of the processor may be reduced to below the third, still lower limit. The application of one or more of the first, second, or third limits, may help to reduce power consumption and heat generation while the processor is within a polling loop or otherwise idle awaiting completion by the co-processor. The method may then advance to block 240, which will be discussed further below.

Now, the scope of the invention is not limited to any known values of T1, T2, or T3. Suitable values for these thresholds may vary widely due in part to such factors as the wide variety of execution rates of processors on which embodiments of the invention may be implemented, and due in part to the ever increasing execution rates of processors. That being said, a few possible, non-limiting, values may help to illustrate certain concepts. In one or more embodiments of the invention, T1 may have a value that is within two orders of magnitude of 100,000 (i.e., $1,000 \leq T1 \leq 10,000,000$), T2 may have a value that is within one order of magnitude of 10,000,000 (i.e., $1,000,000 \leq T2 \leq 100,000,000$), and T3 may have a value that is within one order of magnitude of 100,000,000 (i.e., $10,000,000 \leq T3 \leq 1,000,000,000$). However, these values are merely illustrative, and non-limiting, and the scope of the invention is not limited to just these particular values. Other values may be appropriate for a particular implementation, especially if the speed of execution of the processor differs considerably from that of present day processors manufactured by Intel Corporation, such as, for example, a present day Intel® Core™2 Duo processor.

Referring again to the figure, the method may advance from either of blocks 234, 236, 238, or 239 to block 240. At block 240, the value of the counter (num-inst) previously discussed above in connection with blocks 223 and 231, may be cleared or set to zero. This may clear the count or tally of the number of instructions processed since the last reverse branch instruction. In this way, num-inst will start again with one for the first instruction received in the re-execution of the loop.

The method may then advance from block 240 to block 241, where the method may terminate. As before, the termination of the method may only represent the termination of the method for the current instruction, and another instance of the method may be performed, starting at block 220, for the next instruction received for processing.

Recall that the method may advance from block 223 to block 224, which may represent a promotion stage of the method, wherein a determination may be made whether or not to remove a previously imposed limit on the maximum power of a processor.

FIG. 3 is a block flow diagram illustrating remove limit processing 324, according to one or more embodiments of the invention. The method may determine whether a limit on processor power has been imposed, and if so whether the limit may be removed, or at least reduced.

The method may commence and advance to block 346. At block 346, a determination may optionally be made whether a limit or ceiling has been previously imposed on the maximum power of a processor.

If a limit has not been imposed (i.e., "no" is the determination at block 346), then the method may advance to block 347, where the method may end. This determination, which is optional, may help to improve efficiency by avoiding further processing described below when no limit on processor power is presently imposed.

Alternatively, if a limit has been imposed (i.e., "yes" is the determination at block 346), then the method may advance to block 349. At block 349, a determination may be made whether the running counter representing the number of instructions processed since the last reverse branch instruction was encountered (num-inst) is greater than a second given threshold or value, which may be larger than a typical polling loop size.

In one or more embodiments of the invention, the second given threshold or value may be the largest value of num-inst stored in the table, list, stack, record, or other storage. Recall that the number of instructions in each loop (num-inst) may be stored in the table or other storage for each loop previously encountered at block 231. By way of example, a comparison may be made against all of the values of num-inst stored in the table, or as another example the values of num-inst stored in the table may be sorted and the largest value identified and used for comparison.

Alternatively, in one or more embodiments of the invention, the second given threshold or value may be an arbitrarily large threshold or value, such as, for example, a number larger than expected for loops that tend to stall and produce little if any useful work. This may be estimated or empirically determined for a particular implementation, such as, for example, by examining the sizes of loops that tend to stall the main processor.

Referring again to block 349, if the current running counter num-inst is not greater than the given threshold or value (i.e., "no" is the determination at block 349), then the method may advance to block 353, where the method may end. Since the current running counter num-inst is not greater than the given threshold or value, execution may still be within one or more of the previously encountered loops, and the existing limits imposed on the processor power may have merits.

Furthermore, sometimes large loops may be performing useful processing even when they are repeated a large number of times. So a potential advantage is that power may not be unnecessarily limited in such large loops having relatively more instructions than other loops. Conversely, excessive repeated execution within small sized loops is often indicative of wasted work that need not use the full performance or computational power of the processor.

Alternatively, if the current running counter num-inst is greater than the given threshold or value (i.e., "yes" is the determination at block 349), then the method may advance to block 350. At block 350, a currently imposed limit on the power of the processor may be removed, or at least reduced by one or more levels. Since the current running counter num-inst is greater than the value and/or greater than the number of instructions in the largest loop presently encountered and currently indicated in the list, table, or other storage, execution may have broken out of all of the previously encountered loops currently indicated in the storage. In such a case, it may be appropriate to remove or reduce the limits that have been imposed based on these loops.

The method may advance from block 350 to block 351. At block 351, the entries in the table, list, stack, data structure, record, or other storage may be cleared or deleted. Then, at block 352, the loop counter representing the number of times the loops previously encountered and previously referred to in connection with block 232 may be cleared or zeroed. The method may then end at block 353.

Now, the scope of the invention is not limited to using hash functions or the other functions described above. In one or more alternate embodiments, one or more hint instructions may be included in a loop, and the number of instructions counted between repeat encounters of the hint instructions may be used as a signature to identify the loop and count the number of times the loop is performed.

A non-limiting example of a hint instruction, HINT_POLLING( ), which may be included in code is shown below.

```
void WaitForFlipDone(...) {
//...
while ((*pSwTag != *pHwTag) && (MaxCount < 0x10000000)) {
HINT_POLLING( );
MaxCount++;
  }
//...
}
```

In this particular case, the hint instruction is included in a polling loop in which the main processor may wait on a snooped write into a memory location through which the co-processor may indicate that a specific task has been completed for synchronization of dependencies. Hint instructions may similarly be included in other polling loops by compilers, coders, or programmers. Such hint instructions may be placed at various locations within the loops as long as at least one hint instruction is included in each loop.

The number of instructions encountered between hint instructions may be counted, such as, for example, including a counter that is incremented each time an instruction that is not a hint instruction is encountered. If the same number of instructions between hint instructions is repeated a large number of times, this may suggest or strongly suggest repeat performance of a tight polling loop.

In one or more embodiments of the invention, additional information may optionally be combined with the counted number of instructions to provide additional uniqueness or distinctiveness to distinguish one loop from another, although this is not required. Examples of suitable additional information includes, but is not limited to, a hash, a unique identifier generated by the coder/compiler or otherwise included with the hint instruction, a value or other indication of the instruction before the hint instruction, or some other additional information.

Figure 4:
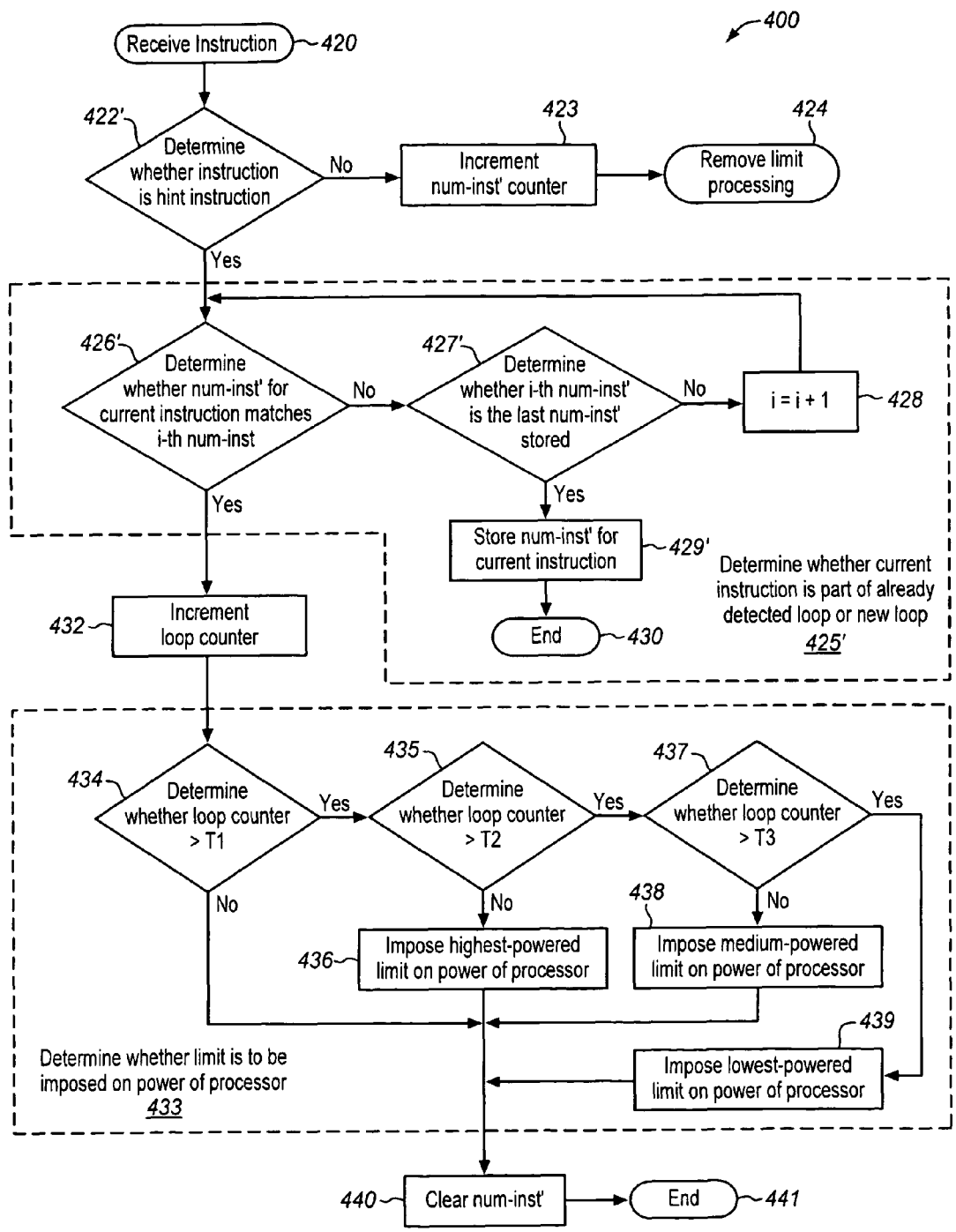
FIG. 4 is a block flow diagrams of a method of managing power of a processor using hint instructions and number of instructions as a signature, according to one or more embodiments of the invention.
Figure 5:
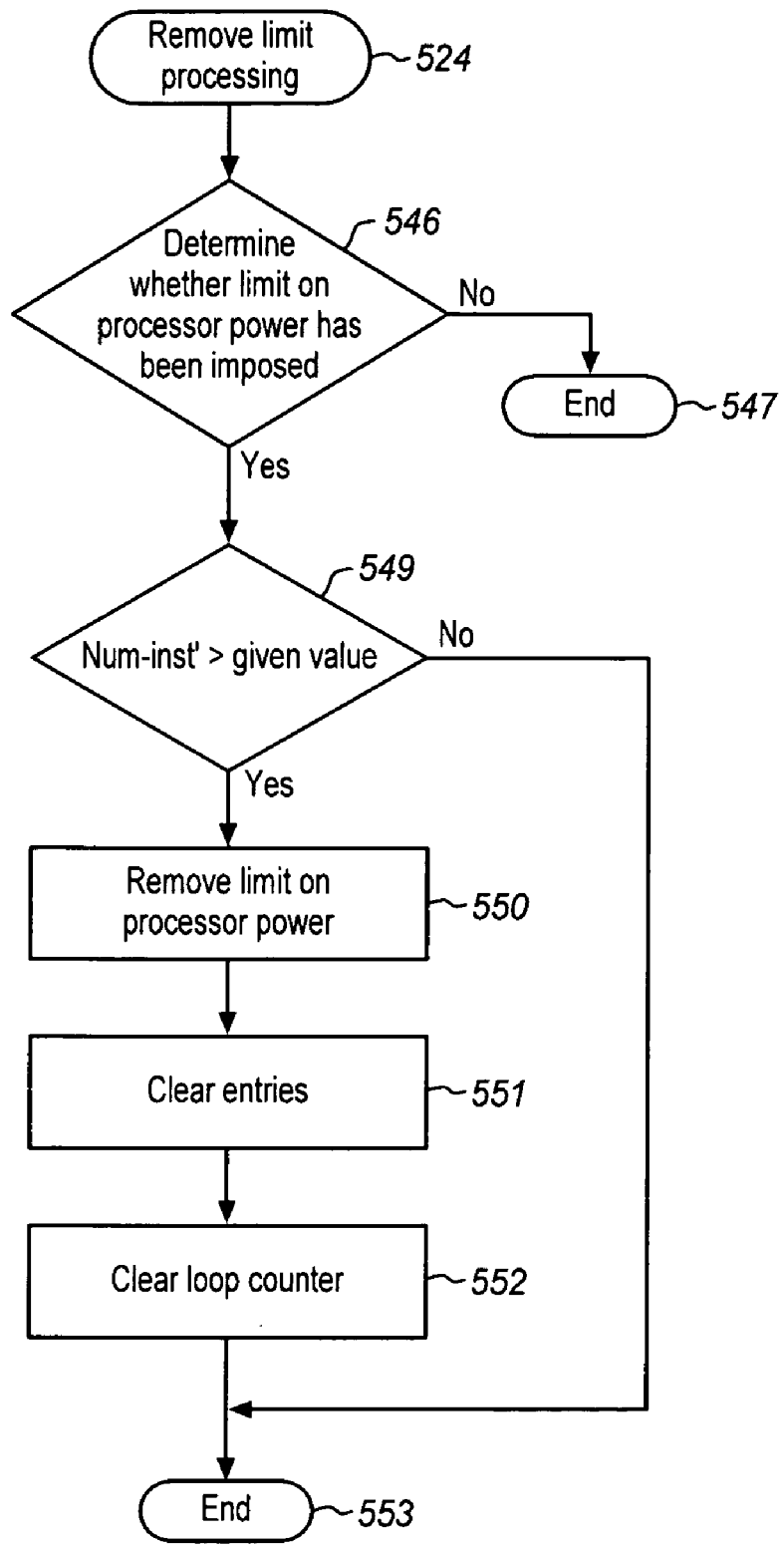
FIG. 5 is a block flow diagram illustrating remove limit processing using instructions counted using the method of FIG. 4, according to one or more embodiments of the invention.

FIGS. 4-5 are block flow diagrams of an alternate method of managing power of a processor using hint instructions, according to one or more embodiments of the invention. FIG. 4 bears a number of similarities to FIG. 2, and FIG. 5 bears a number of similarities to FIG. 3. For convenience terminal portions of reference numerals have been repeated among FIGS. 2-5 to indicate corresponding or analogous operations. For example, the reference numerals 420, 422', 423, 424, 425, 426', 427', 428, 429', 430, 432, 433, 434, 435, 436, 437, 438, 439, 440, and 441 correspond to or are analogous to the reference numerals 220, 222, 223, 224, 225, 226, 227, 228, 229, 230, 232, 233, 234, 235, 236, 237, 238, 239, 240, and 241, respectively. Likewise, the reference numerals 546, 547, 549, 550, 551, 552, and 553 correspond to or are analogous to the reference numerals 346, 347, 349, 350, 351, 352, and 353, respectively. To avoid obscuring certain concepts, the following discussion will focus primarily on the different and/or additional operations and aspects. In this regard, primes (') are included alongside the reference numerals to designate relatively more different operations, which will be discussed in further detail below.

Referring now to FIG. 4, the blocks with primes (') will be discussed in greater detail. After receiving an instruction at block 420, a determination may be made whether the instruction is a hint instruction, at block 422'. By way of example, the hint instruction may be named a hint instruction or otherwise known ahead of time to be a hint instruction.

If the instruction is not a hint instruction, then a running counter representing the number of instructions processed since the last hint instruction was encountered (num-inst') may be incremented, or increased by one, to account for the current non-hint instruction. Num-inst' is distinguished from the counter num-inst discussed above in that it counts the number of instructions between hint instructions, instead of between reverse branch instructions.

Alternatively, if the instruction is a hint instruction, then the method may advance to a slightly different approach 425' of determining whether the current instruction is part of an already detected loop or new loop. At block 426', a determination may be made whether the num-inst' for the current instruction matches the i-th indexed num-inst' in a table, list, stack, data structure, record, or other storage. Similar to before, during previous performances of the method, multiple different loops may be encountered. For each encountered loop, the number of instructions encountered between hint instructions (num-inst') may be stored in the storage. The num-inst' may serve as a relatively unique fingerprint to identify the loop, particularly when the loop has a large number of instructions.

If the num-inst' do not match (i.e., "no" is the determination at block 426'), then a determination may be made whether the counter (i) indexes the last entry in the table, list, stack, data structure, record, or other storage, at block 427'. If the counter (i) does not index the last entry, then the counter may be incremented at block 428, and processing may revisit block 426'.

Otherwise, if the counter (i) indexes the last entry, then num-inst' may be stored for the current hint instruction in the storage, at block 429'. The method may then end, at block 480.

Other aspects of the method illustrated in FIGS. 4-5 may optionally be similar to that those shown and described for the method illustrated in FIGS. 2-3. To avoid obscuring the description, these aspects will not be repeated.

Now, in some cases, repeatedly performed small loops may tend to involve wasted work more than repeatedly performed large loops. In some cases, large loops, even if repeatedly performed many times, may actually be performing useful work that may justify higher processor power. One or more embodiments of the invention may optionally determine whether or not to impose limits on the power of a processor and/or determine how much limit to impose based in part on loop size.

Figure 6:
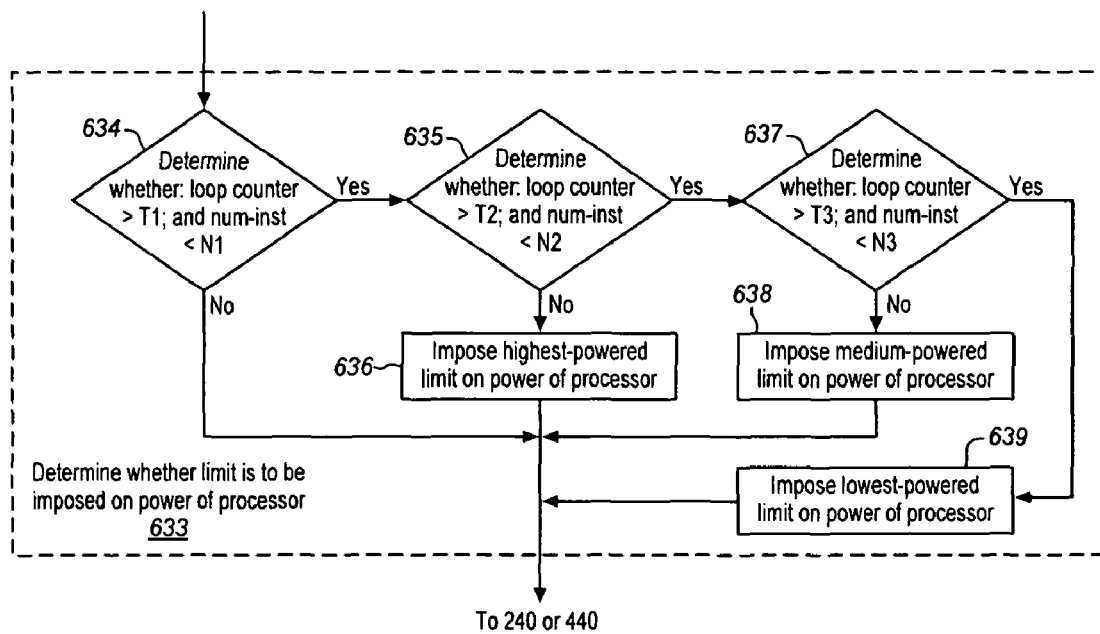
FIG. 6 is a block flow diagram illustrating an alternate embodiment of determining whether a limit is to be imposed on a power of a processor based in part on loop size, according to one or more embodiments of the invention.

FIG. 6 is a block flow diagram illustrating an alternate embodiment of determining whether a limit is to be imposed on a power of a processor 633 based in part on loop size, according to one or more embodiments of the invention. This block flow diagram shows similarity to the processing 233 and 433 discussed above. For brevity, the discussion below will focus primarily on the differences, and the similarities will not be repeated. One notable difference is that determining of whether or not to impose the limit on the power of the processor and/or how much limit to impose is based on the size or number of instructions in the loop in addition to the number of times the loop has been performed.

Block 634 of the method may be entered, such as, for example, from block 232 or block 432. At block 634, a determination may be made whether the loop counter is greater than a first lowest-valued loop counter threshold (T1), and num-inst is less than a first highest-valued number of instructions threshold (N1).

If either or both conditions are false (i.e., "no" is the determination at block 634), then limiting the maximum power of the processor may not yet be justified. In such a case, the method may exit, such as, for example, to block 240 or 440.

Alternatively, if both conditions are true (i.e., "yes" is the determination at block 634), then the method may advance to block 635. At block 635 another determination may be made whether the loop counter is greater than a second middle-valued loop counter threshold (T2), and num-inst is less than a second middle-valued number of instructions threshold (N2). T2 may be greater than T1, and N2 may be less than N1.

If either or both conditions are false (i.e., "no" is the determination at block 635), then the method may advance to block 636. At block 636 a first highest-powered limit or ceiling may be imposed on the maximum power of the processor, and the power of the processor may be reduced to below the first limit. The method may then exit, such as, for example, to block 240 or 440.

Alternatively, if both conditions are true (i.e., "yes" is the determination at block 635), then the method may advance to block 637. At block 637, yet another determination may be made whether the loop counter is greater than a third highest-valued loop counter threshold (T3), and num-inst is less than a third lowest-valued number of instructions threshold (N3). T3 may be greater than T2, and N3 may be lower than N2.

If either or both conditions are false (i.e., "no" is the determination at block 637), then the method may advance to block 638. At block 638 a second, medium-powered limit or ceiling, may be placed on the maximum power of the processor, and the power of the processor may be reduced to below the second, lower limit. The second limit may represent a lesser total operational power than the first limit. The method may then exit, such as, for example, to block 240 or block 440.

Alternatively, if both conditions are true (i.e., "yes" is the determination at block 637), then the method may advance to block 639. At block 639, a third, lowest-powered limit or ceiling, which may be lower than the first and second limits, may be placed on the maximum power of the processor, and the power of the processor may be reduced to below the third, still lower limit. The method may then exit, such as, for example, to block 240 or block 440.

The scope of the invention is not limited to any known values of N1, N2, or N3. In one or more embodiments of the invention, N1 may range from about 500 to about 2000 instructions, N2 may range from about 100 to about 500 instructions, and N3 may range from about 2 to 100 instructions. However, these values are merely illustrative, and non-limiting, and the scope of the invention is not limited to just these particular values.

Accordingly, power of a processor may be managed based on both how many times a loop has been performed and the size of the loop. Advantageously, this may help to reduce the number of limits imposed on the processor when the processor is executing large loops that may actually be performing useful operations. However, this is optional, and not required. In one or more embodiments of the invention, power savings and/or reduction in heat generation may be obtained based on counting the number of times a loop has been performed without looking at the size of the loop.

Figure 7:
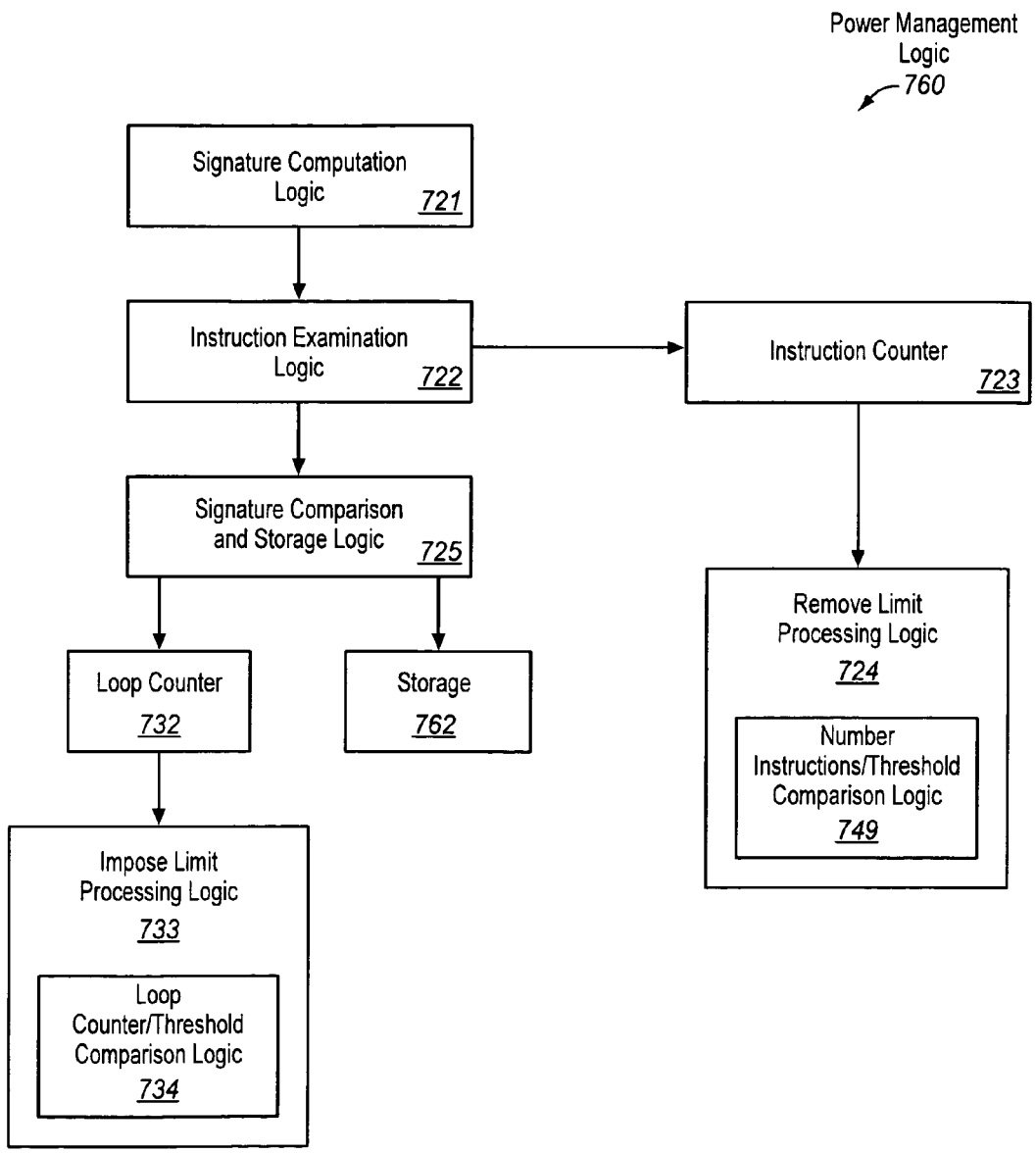
FIG. 7 is a block diagram of power management logic, according to one or more embodiments of the invention.

FIG. 7 is a block diagram of power management logic 760, according to one or more embodiments of the invention. The power management logic may perform one or more of the methods disclosed herein. In one or more embodiments of the invention, the logic may include hardware, such as, for example, circuitry within a processor or other microelectronic device. Alternatively, in one or more embodiments of the invention, the logic may include software, such as, for example, a routine or other set of instructions of, or interfacing with, an operating system. As yet another option, in one or more embodiments of the invention, the logic may include a combination of hardware and software.

The illustrated logic optionally includes signature computation logic 721 to compute a running hash or other signature of a loop. The signature computation logic may be omitted in embodiments of the invention, as discussed above in the context of the hint instructions.

Instruction examination logic 722 is coupled with, or otherwise in communication with, the signature computation logic. The instruction examination logic may examine the instructions to determine their type. For example, the instruction examination logic may determine whether a current instruction being processed is a reverse branch instruction or a hint instruction.

An instruction counter 723 is coupled with, or otherwise in communication with, the instruction examination logic. The instruction counter may keep a count of the number of instructions processed since the last loop was detected.

Remove limit processing logic 724 is coupled with, or otherwise in communication with, the instruction counter. The remove limit processing logic may determine whether to remove or reduce limits previously imposed on the power of the processor. As shown, the remove limit processing logic may include number instructions/threshold comparison logic 749 to compare the number of instructions with a threshold or other value in order to make this determination.

Signature comparison and storage logic 725 is also coupled with, or otherwise in communication with, the instruction examination logic. The signature comparison and storage logic may use the signature for the current instruction to determine whether the current instruction is part of an already detected loop or a new loop to be stored.

A storage 762 is coupled with, or otherwise in communication with, the signature comparison and storage logic to store the loop for the current instruction if it is a new loop. Alternatively, a loop counter 732 is coupled with, or otherwise in communication with, the signature comparison and storage logic to keep a count of the number of times the loop has been performed if the current instruction is part of an already detected loop.

Impose limit processing logic 733 is coupled with, or otherwise in communication with, the loop counter. The impose limit processing logic may determine whether a limit is to be imposed on the power of the processor based on the count of loops available from the loop counter, and if so to impose such a limit. As shown, the impose limit processing logic may include at least one loop counter/threshold comparison logic 734 to compare the number of times the loop has been performed with a threshold in order to make this determination.

Figure 8:
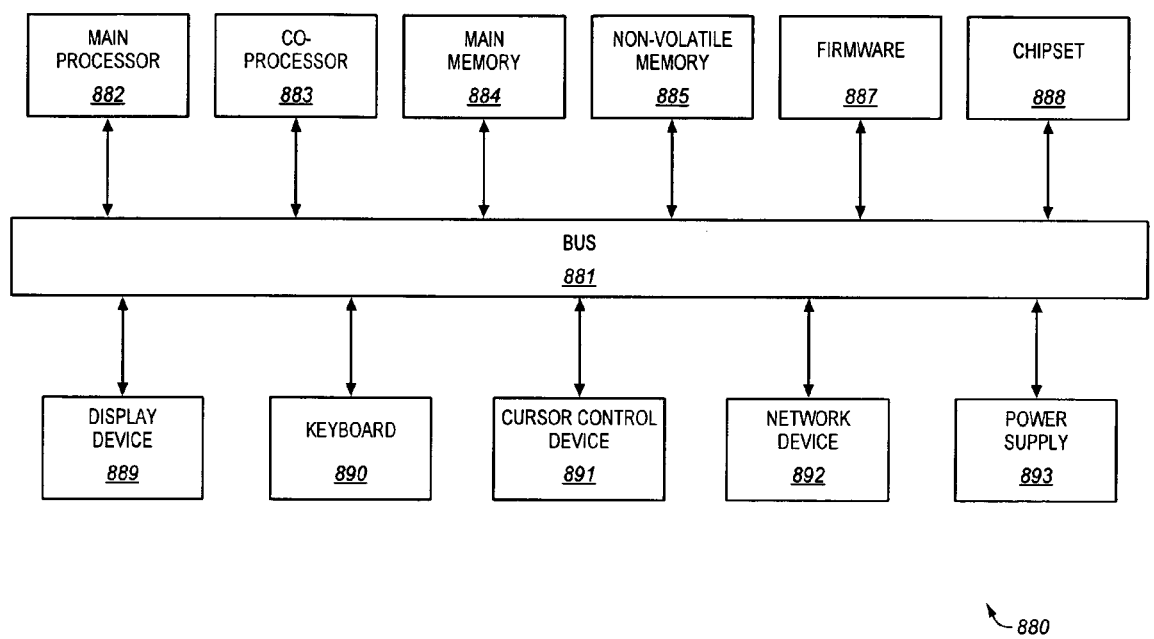
FIG. 8 shows a block diagram of a computer system in which one or more embodiments of the invention may be implemented.

FIG. 8 shows a block diagram of a computer system 880 in which one or more embodiments of the invention may be implemented. The computer system may include, but is not limited to, a portable, laptop, desktop, server, or mainframe computer, to name just a few examples. The computer system represents one possible computer system for implementing one or more embodiments of the invention, however other computer systems and variations of the computer system are also possible.

The computer system includes at least one bus 881 to communicate information, and a main processor 882 and co-processor 883 coupled with the bus to process information. Alternatively, other interconnects or serial interconnects besides buses may optionally be used, such as, for example, PCI Express, or others known in the arts. In one or more embodiments of the invention, the co-processor and/or the main processor may include a microprocessor available from Intel Corporation, of Santa Clara, Calif., although this is not required. In one or more embodiments the co-processor and/or the main processor may include multiple processor cores working together, although this is not required.

The computer system further includes a main memory 884, such as, for example, a random access memory (RAM) or other dynamic storage device, coupled with the bus to store information including instructions to be executed by the main processor and co-processor. The main memory also may be used to store temporary variables or other intermediate information during execution of instructions by the processor. Different types of RAM memory that are included in some, but not all computer systems, include, but are not limited to, static-RAM (SRAM) and dynamic-RAM (DRAM). Memory that does not need to be dynamically refreshed is also suitable.

The computer system also includes a non-volatile memory 885, such as, for example, a read only memory (ROM) or other static storage device, coupled with the bus to store static information and instructions for the processors. In one or more embodiments of the invention, the non-volatile memory may store the basic input-output system (BIOS). Different types of non-volatile memory that are included in some, but not all, computer systems include, but are not limited to, Flash memory, programmable ROM (PROM), erasable-and-programmable ROM (EPROM), and electrically-erasable-and-programmable ROM (EEPROM).

Firmware 887 may optionally be coupled with the bus. The firmware may include a combination of software and hardware. By way of example, the firmware may include Electronically Programmable Read-Only Memory (EPROM) having instructions or routines stored. The firmware may embed foundation code, basic input/output system code (BIOS), or the like. The firmware may make it possible for the computer system to boot itself.

The computer system includes a chipset 888. The chipset may include a set or group of integrated circuits that work together to provide interfacing and other functions. In one or more embodiments of the invention, the chipset may be one of those available from Intel Corporation, although this is not required.

The computer system may also optionally be coupled via the bus with a display device 889, such as, for example, a cathode ray tube (CRT) or liquid crystal display (LCD), to display information to an end user. In one or more embodiments of the invention, such as, for example, in a laptop, the display may be integral with the computer system, although this is not required.

A keyboard 890, or other alphanumeric input device including alphanumeric and other keys, may optionally be coupled with the bus to communicate information and command selections to the processor. In one or more embodiments of the invention, such as, for example, in a laptop, the keyboard may be integral with the computer system, although this is not required. Another type of user input device that may optionally be included is a cursor control device 891, such as, for example, a mouse, trackball, or cursor direction keys, to communicate direction information and command selections to the processor, and to control cursor movement on the display device.

A network device 892 may also optionally be coupled with the bus. Network devices are included in some, but not all, computer systems. Suitable network devices include, but are not limited to, wired and wireless telephony interfaces, such as, for example, those provided in modems and network interface cards.

The computer system may also include a power supply 893 to provide power to the computer system. In one or more embodiments of the invention, the power supply may include an alternating current (AC) adapter circuit. The AC adapter circuit may allow AC current from an outlet or other source to be converted to direct current (DC) to power the computer system.

In one or more embodiments of the invention, the computer system may represent a laptop or else may represent other types of mobile computing devices. Examples of suitable mobile computing devices include, but are not limited to, laptop computers, cell phones, personal digital assistants, and like devices. In such embodiments, the system may include an DC power source, such as, for example, a battery or fuel cell. The battery or fuel cell may power the computer system when AC power from an outlet is not available. The total power available from the battery or fuel cell may be limited. Advantageously, in one or more embodiments of the invention, the power conserving approaches disclosed herein may allow prolonged use of the computer system while operating on power from the battery, fuel cell, or other finite source of DC power.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact or communicate with one another.

In the description above, for the purposes of explanation, numerous specific details have been set forth in order to provide a thorough understanding of the embodiments of the invention. It will be apparent however, to one skilled in the art, that one or more other embodiments may be practiced without some of these specific details. In one aspect, other signatures besides hashes, checksums, counts of loop instructions, and others method above may optionally be used. For example, message digest functions, string search functions, and other functions used in cryptography or error correaction may potentially be used. The particular embodiments described are not provided to limit the invention but to illustrate it. The scope of the invention is not to be determined by the specific examples provided above but only by the claims below. In other instances, well-known circuits, structures, devices, and operations have been shown in block diagram form or without detail in order to avoid obscuring the understanding of the description.

Various operations and methods have been described. Some of the methods have been described in a basic form, but operations may optionally be added to and/or removed from the methods. For example, in alternate embodiments, fewer or more than the illustrated number of threshold comparisons and limits may optionally be utilized. The operations of the methods may also often optionally be performed in different order. For example, in one or more alternate embodiments, the running hash may optionally only be generated for instructions determined to be reverse branch instructions. As another example, the counter (i) used to index the storage may start at a highest value and be decremented thereafter, or entries from the storage may be selected randomly or according to other orders. These are just a few examples. Many modifications and adaptations may be made to the methods and are contemplated.

Certain operations may be performed by hardware components, or may be embodied in machine-executable instructions accessible from and stored on a machine-readable medium, that may be used to cause, or at least result in, a circuit programmed with the instructions performing the operations. The circuit may include a general-purpose or special-purpose processor, or logic circuit, to name just a few examples. The operations may also optionally be performed by a combination of hardware and software.

One or more embodiments of the invention may be provided as a program product or other article of manufacture that may include a machine-accessible and/or readable medium having stored thereon one or more instructions and/or data structures. The medium may provide instructions, which, if executed by a machine, may result in and/or cause the machine to perform one or more of the operations or methods disclosed herein. Suitable machines include, but are not limited to, computer systems, laptop computers, digital assistants (PDAs), cellular telephones, and a wide variety of other electronic devices with one or more processors, to name just a few examples.

The medium may include, a mechanism that provides, for example stores and/or transmits, information in a form that is accessible by the machine. For example, the medium may optionally include recordable and/or non-recordable mediums, such as, for example, floppy diskette, optical storage medium, optical disk, CD-ROM, magnetic disk, magneto-optical disk, read only memory (ROM), programmable ROM (PROM), erasable-and-programmable ROM (EPROM), electrically-erasable-and-programmable ROM (EEPROM), random access memory (RAM), static-RAM (SRAM), dynamic-RAM (DRAM), Flash memory, and combinations thereof.

For clarity, in the claims, any element that does not explicitly state "means for" performing a specified function, or "step for" performing a specified function, is not to be interpreted as a "means" or "step" clause as specified in 35 U.S.C. Section 112, Paragraph 6. In particular, any potential use of "step of" in the claims herein is not intended to invoke the provisions of 35 U.S.C. Section 112, Paragraph 6.

It should also be appreciated that reference throughout this specification to "one embodiment", "an embodiment", or "one or more embodiments", for example, means that a particular feature may be included in the practice of the invention. Similarly, it should be appreciated that in the description various features are sometimes grouped together in a single embodiment, Figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects may lie in less than all features of a single disclosed embodiment. Thus, the claims following the Detailed Description are hereby expressly incorporated into this Detailed Description, with each claim standing on its own as a separate embodiment of the invention.

What is claimed is:

1. A method comprising:
counting a number of times a processor has performed a loop, wherein said
counting the number of times the processor has performed the loop includes:
(a) generating a signature for the loop, wherein said generating the signature comprises using a function including evaluating the function with instructions of the loop; and
(b) using the signature to determine that the loop has been performed during said counting;
determining whether the number of times the processor has performed the loop is greater than one or more values; and
imposing a limit on a power of the processor if the number of times the processor has performed the loop is greater than at least one of the one or more values;
reducing the limit imposed on the power of the processor upon determining that a number of instructions executed since a last loop indication instruction is greater than a value.

2. The method of claim 1, wherein the function has properties that:
if outputs generated using the function are different, then corresponding inputs to the function are different; and
equality of the outputs generated using the function suggests equality of the corresponding inputs to the function.

3. The method of claim 2, wherein the function comprises a function selected from a hash function and a checksum function and wherein the function comprises a running function that is evaluated with information for the instructions of the loop used to evaluate the function.

4. The method of claim 1, wherein said generating the signature for the loop comprises inputting data from the instructions of the loop to the function.

5. The method of claim 4, wherein the data comprises one or more of opcodes, immediate data, and addresses, natively included with the instructions.

6. The method of claim 1, wherein said imposing the limit on the power of the processor comprises one or more selected from imposing a limit on a frequency of at least a portion of the processor, imposing a limit on a voltage of at least a portion of the processor, and disabling a portion of the processor.

7. The method of claim 1:
further comprising determining if a size of the loop is less than one or more size values; and
wherein said imposing the limit on the power of the processor is conditioned on the size of the loop being less than at least one of the one or more size values.

8. The method of claim 1, further comprising the processor continuing to perform the loop while the limit is imposed on the power of the processor.

9. The method of claim 1, wherein imposing the limit on the power of the processor comprises selectively imposing the limit on the power of a core of the processor.

10. The method of claim 1, further comprising imposing another lower power limit on the power of the processor if the number of times the processor has performed the loop is greater than another value.

11. An apparatus comprising:
one or more cores of a processor;
a counter to count a number of times the processor has performed a loop;
logic to impose a limit on power of the processor if the number of times the processor has performed the loop is greater than one or more values;
a second counter to keep a second count of a number of instructions in the loop; and
logic to condition the imposing of the limit on the power of the processor on the second count of the number of instructions in the loop being less than one or more values,
where at least one of the counter, the second counter, the logic to impose the limit on the power of the processor, and the one or more cores comprises circuitry of the processor.

12. The apparatus of claim 11, further comprising signature computation logic to compute a signature for the loop, wherein the signature computation logic comprises a function to compute the signature for the loop based on information for instructions of the loop and the function having properties that:
if outputs generated using the function are different, then corresponding inputs to the function are different; and
equality of the outputs generated using the function suggests equality of the corresponding inputs to the function.

13. The apparatus, of claim 12, wherein the function comprises a function selected from a hash function and a checksum function and wherein the function comprises a running function that is evaluated with the information for the instructions of the loop used to compute the signature.

14. The apparatus of claim 11, further comprising:
loop identification logic to identify the loop from previously encountered loops using the second count of the number of instructions in the loop.

15. The apparatus of claim 11, further comprising instruction examination logic to determine that an instruction of the loop is a hint instruction and logic to detect the loop using the hint instruction.

16. The apparatus of claim 11, further comprising hardware coupled with the logic to impose the limit, the hardware to perform one or more selected from imposing a limit on a frequency of at least a portion of the processor, imposing a limit on a voltage of at least a portion of the processor, and disabling a portion of the processor.

17. The apparatus of claim 16, wherein the hardware comprises one or more selected from a fuse, a control, and a circuit, and wherein the portion of the processor comprises a core.

18. A system comprising the apparatus of claim 11, wherein the system further comprises a direct current (DC) power supply to power the apparatus.

19. An apparatus comprising:
a power management logic, the power management logic including:
a counter to count a number of times a processor has performed a loop;
logic to impose a limit on power of the processor upon determining that the number of times the processor has performed the loop is greater than one or more thresholds; and
logic to remove the limit imposed on the power of the processor if a number of instructions executed since a last loop indication instruction is greater than a value, where the power management logic comprises circuitry.

20. The apparatus of claim 19, wherein the power management logic further comprises:
signature computation logic to compute a signature for the loop by evaluating a function based on information for the loop; and
signature comparison logic to compare the signature computed for the loop with signatures computed for previously encountered loops to identify the loop during said counting.

21. The apparatus of claim 20, wherein the signature computation logic is to evaluate a function having properties that:
if outputs generated using the function are different, then corresponding inputs to the function are different; and
equality of the inputs to the function are likely equal if the corresponding outputs generated using the function are equal.

22. The apparatus of claim 19, wherein the power management logic further comprises:
a second counter to keep a count of the number of instructions in the loop; and
loop identification logic to identify the loop from previously encountered loops using the count of the number of instructions in the loop.

23. The apparatus of claim 19, wherein the logic to remove the limit imposed on the power of the processor comprises logic to remove the limit if the number of instructions executed since the last loop indication instruction is greater than a value selected from an average polling loop size, a value larger than expected for a polling loop, and a largest number of instructions encountered in a loop thus far during execution.

24. The apparatus of claim 19, implemented in a system, the system comprising:
a dynamic random access memory (DRAM); and
a main processor coupled with the DRAM, and wherein the power management logic is part of the main processor.

25. An article of manufacture comprising:
a machine-accessible medium having stored thereon instructions that if executed result in a machine performing operations including,
counting a number of times a processor has performed a loop, wherein said counting the number of times the processor has performed the loop includes (a) generating a signature for the loop using a function with a property that when outputs generated using the function are different then inputs to the function are different, and (b) using the signature to determine that the loop has been performed during said counting,
determining whether the number of times the processor has performed the loop is greater than one or more values,
imposing a limit on a power of the processor if the number of times the processor has performed the loop is greater than at least one of the one or more values,
determining whether a number of instructions executed since a last loop indication instruction is greater than a value, and
if the number of instructions is greater than the value, removing the limit imposed on the power of the processor, and
wherein the medium comprises at least one of a floppy diskette, an optical storage medium, an optical disk, a CD-ROM, a magnetic disk, a magneto-optical disk, a read only memory (ROM), a programmable ROM (PROM), an erasable-and-programmable ROM (EPROM), an electrically-erasable-and-programmable ROM (EEPROM), a random access memory (RAM), a static-RAM (SRAM), a dynamic-RAM (DRAM), a memory, and a Flash memory.

26. An apparatus comprising:
a functional unit of a processor, the functional unit including circuitry;
a counter to count a number of times the processor has performed a loop indicated by a hint instruction, where the apparatus is to identify a loop by a number of instructions counted between hint instructions;
logic to impose a limit on power of the processor if the number of times the processor has performed the loop is greater than one or more values.

* * * * *